Aug. 27, 1929.  P. CAROLAN  1,726,014
ARMOR SAFETY SLEEVE
Filed Feb. 17, 1925
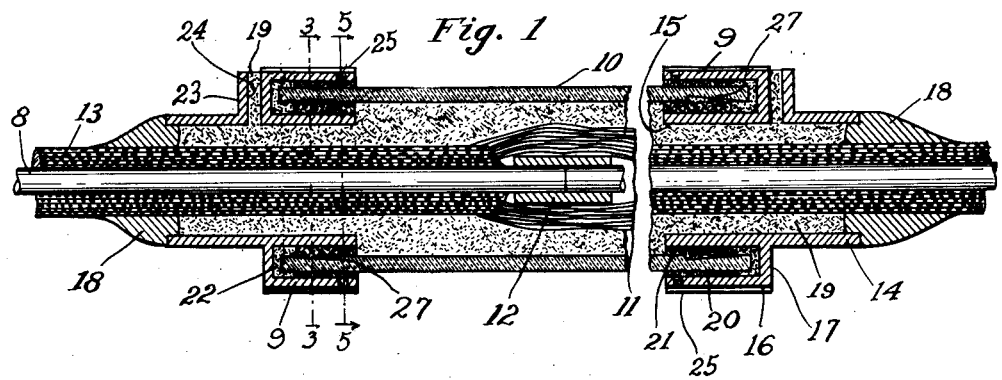
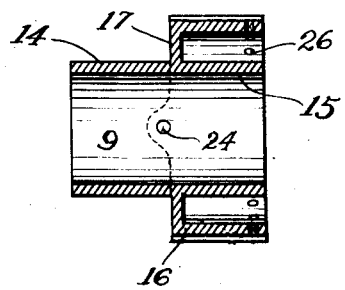
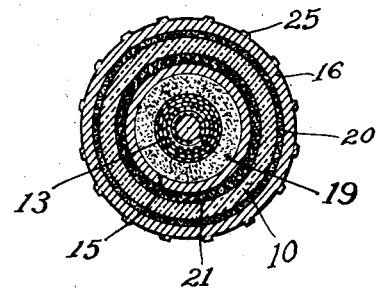
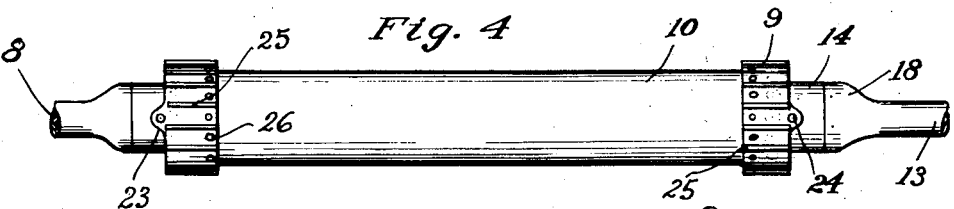
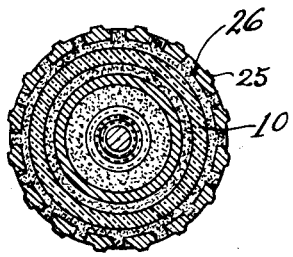
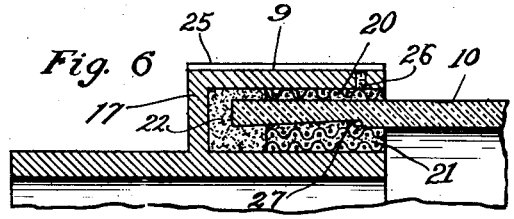
INVETOR
Patrick Carolan
BY Frank D. Gray
ATTORNEY Patented Aug. 27, 1929.

1,726,014

UNITED STATES PATENT OFFICE.

PATRICK CAROLAN, OF CLEVELAND, OHIO.

ARMOR SAFETY SLEEVE.

Application filed February 17, 1925. Serial No. 9,755.

My invention relates to armor safety sleeves and more especially to means for efficiently connecting the ends of the insulating sleeves for protecting cable splices, with the covering of conducting cables, and at the same time effect an hermetical sealing of the cavity about the splice between the ends of the conductors to be secured together. It has long been known to be desirable that the armor sleeve for such splices shall be strong, light in weight and possessing high insulating properties. The difficulty has been in the use of former well-known safety sleeves for the purpose, that great difficulty has been experienced in making the proper connection between the ends of the sleeve and the insulating cover of the cable or other conductor to be spliced. These disadvantages I have overcome by the provision of certain metallic cuffs or gaskets which I have found wholly satisfactory for the purpose, and have solved the problem, as will be explained hereinafter in detail.

It is an object of my invention to provide a safety sleeve possessing high insulating qualities and to secure to each end of such sleeve metallic cuffs or gaskets by strong cement composition so that the axial strength of such cuffs and attached sleeve shall be substantially that of the sleeve alone or the cable itself before splicing. By securing the outer ends of the cuffs to the cable covering the linear strength of the cable will clearly not be borne by the splicing element directly connecting the cable ends, but will be borne by the insulating safety sleeve, the cuffs and the means fastening the latter to the cable insulation.

It is a further object of my improvement to provide the end cuffs with aperture or apertures by which suitable insulating composition may be directed therethrough into the cavity between the spliced conductor ends and the said sleeve.

The ultimate object of my invention is therefore to provide insulating safety sleeves for cable splices that will prevent electrical charges from following the covering of the conductors, and in providing the same to render such construction more dependable and at the same time less complicated than structures before used to approximate the insulating function desired.

With these and other objects in view I declare my present invention to reside in the novel features hereinafter described, pointed out in the appended claims and illustrated in the accompanying drawings, in which—

Figure 1 is a longitudinal sectional view of the cable splice and safety elements therefor, a portion being omitted;

Figure 2 is a longitudinal sectional view of one of the end cuffs;

Figure 3 is a transverse section taken on line 3—3 of Fig. 1;

Figure 4 is a side elevation of the covered splice;

Figure 5 is a transverse section taken on the line 5—5 of Fig. 1; and

Figure 6 is longitudinal section of parts attached to the end of the sleeve.

In the drawings, two conductors 8 are shown brought into end to end relation in position for splicing. In such arrangement, the cable insulation or armor 13 is first cut back or removed for some distance from the end, when a splice tubular member of suitable material 12, such as copper, is applied to the contacting ends and insulating wrapping material 11 wound over the conducting material to protect the splice.

The safety sleeve 10 is of very efficient insulating material and of great strength, such as porcelain, and may be molded in different sizes for use in different conditions as may arise from use with different sizes of conductors and the varying load they are intended to carry. Ordinarily, the sleeves and attached parts will be made in four sizes that will be considered standard. As a matter of illustration, it may be stated that a sleeve 16 inches long may be six inches in diameter in outside measurement. Such a sleeve would be fully capable of proper use about a conductor, such as a cable for carrying a current at 11,000 volts. These sleeves 10 may be made of all suitable sizes.

About the ends of the open cylinders 10 are placed end cuffs 9 having the form of a cylinder 14 at one end and a double flange at the other end, the outer flange 16 and inner flange 15 being spaced concentrically by a disc-shaped portion 17. These flanges 15 and 16 together with the portion 17 provide a cup-shaped socket between the flanges of suitable size to easily receive the end of the sleeve. This socket is annular in shape and is partly filled with a good cement 22 which is adapted to secure the sleeve end in the socket when inserted therein.

These cuffs are of metal and are usually molded, cast or malleable iron being suitable for the purpose, though other metals may be used in some cases. In any case, the surface will be plated as by tinning to make practicable the connection with the fusible ring 18 to effect a plumber's joint as by soldering, the latter operation being regarded as conventional. At one or more points just back of the wall 17 is molded integrally with the latter a protuberance 23 having a tubular opening 24 therethrough in a direction radial of the cuff for permitting flowing of suitable insulating material 19, such as ozite, into the cavity between the sleeve and cuffs and the insulated conductor. This protuberance 23 is integral with both the part 14 and the wall or shoulder 17. These openings 24 can subsequently be sealed after insulating material 19 has hardened.

A fibrous material such as asbestos is also packed between the sleeve and flange 16 as well as between the sleeve and the inner flange 15. The fiber is wound about the sleeve as well as about flange 15 before inserting the sleeve end into the socket between the flanges. For further wedging the sleeve end into the socket when inserted, an annular groove or recess 27 is formed on the inner surface of the sleeve slightly remote from either end thereof. When, therefore, the asbestos 20 is packed outside the sleeve and the asbestos 21 is packed inside the sleeve and into said groove or recess, a desirable wedging action is effected adding greatly to the secure fastening of the cuffs on the sleeve.

As a further means of strengthening the cuffs 9 on the ends of the sleeve 10, I may provide the cuffs with longitudinal ribs 25 on the outer surface of the flange 16. These ribs are laterally spaced as shown in Figs 4 and 5 of the drawings, and thereby add appreciably to the strength of the flange 16 without too greatly increasing the weight of the cuffs. Also, as a means of securely sealing the cuffs on the sleeve ends, small apertures 26 are provided in the flanges 16 adjacent the edge thereof farthest from the wall 17. These apertures may be made through the flanges between the ribs 25, if the latter are provided, or any number of such apertures may be used in any case whether the ribs are used. It is of course evident that the flange 16 may be corrugated rather than ribbed, and that either structure may be obtained by the single casting operation. Also, the outer surface of flange 15 and inner surface of sleeve 10 may be corrugated, if desired.

It is clear that the cement 22 provided in the socket between the flanges 15 and 16 will, when the sleeve is inserted therein with the asbestos fiber positioned as above explained, ooze out through the fiber, and the cement oozing out externally of the sleeve will eventually fill the apertures 26 further securing the cuffs on the sleeve ends. It is well-known that the coefficient of expansion by heat must be considered in applying the cuffs 9 as stated, and that the two solids porcelain and iron do not have the same coefficient. The provision of the asbestos fiber packings between the sleeve and the flanges 15 and 16, serves to permit a slight relative movement radially because of such slight difference in their coefficients of expansion; and, since there is more apt to be a greater relative movement between the internal flange and the sleeve than between the outer flange and the sleeve, I have provided greater thickness of such fiber in the former space than in the latter. This divergence is somewhat exaggerated in the showing in Fig. 6 of the drawings.

Operation: Assuming that the ends of a conductor 8 are to be spliced together, a ring 18, a cuff 9 and an insulating sleeve 10 are threaded upon one of said ends in the order named, and a ring and cuff applied to the other end to be joined to the first. The splice is then made between the two ends, applying the cylinder or split sleeve 12 thereto, this not being a part of my invention. The wrappings 11 are now applied at the splice after which fiber 21 is applied about the inner flanges 15, cement 22 poured into the cuffs, fiber 20 then applied about the sleeve ends and the latter inserted into the sockets of the cuffs causing the cement to ooze out on both surfaces of the sleeve 10 and saturating the fiber and filling the apertures 26, as above explained. As an alternative which will often be used, the cuffs may be secured to the ends of the sleeve 10 and the sleeve and cuffs prepared as a unit so that only the rings 18 need be separately applied to the conductor ends, the combined sleeve and cuffs being threaded upon the end after one of the rings. The remaining operation would be like the above explanation.

The connected sleeve and cuffs are now positioned over the splice, the rings 18 are brought up in contact with the cylinders 14 of the cuffs and the rings joined to the sleeve and covering 13 of the conductor in the usual manner of forming plumbers' joints. This is especially practicable since the cuffs are metallic and are tinned to make soldering possible. Proper insulating composition, such as a silicate or ozite, for example, is then poured into the cavity within the sleeve and cuffs, in a plastic condition, through the tubular openings 24 and permitted to cool and solidify. The splice is now protected from all electric charges that may reach the covering of the conductor 8 at any point, since the sleeve 10 is a very effective insulator and the insulation 19 protects all parts of the inner space from dampness that would break down the insulation therein.

It is to be noted that it is the purpose of my invention to protect the covering of the cables or other conductors rather than the conductors themselves. My circuit breaker prevents the charges following the covering of the conductors, separating the covering into independent sections each extending no further than the splices at either end where my circuit breaker is applied. It is a great advantage of my improvement that these cuffs, sleeves and rings 18 are made in quantity. None of these parts need be molded in situ when making the splice. Being of iron, the cuffs are ready for application where needed as well as the sleeve, the only work involving operating upon the improved parts being the forming of the joints between the sleeve and the cuffs and between the latter and the cable covering, which latter must of course be done in situ. The filling of the cavity between the sleeve and the cable covering is done after the joints are effected.

An especial advantage of my novel construction lies in the great tensile strength of the combined sleeve, cuffs and cable covering. It has been found that the strength axially of the sleeve of the combined covering structure is as great as the sleeve itself. This results in a covered line that will bear as great longitudinal strain as a covered cable would have if it had no splices whatever. When my structure is used, therefore, no strain is borne by the conductor splice directly, the strain on the line being borne at this point by the sleeve, cuffs and the joints between the cuffs and cover 13. This advantage results from the very effective connection between the cuffs here disclosed and the sleeve, and which I regard as a matter of great importance.

Various changes in the form and details of my invention may be resorted to without departing from the spirit thereof, and I consider myself entitled to all forms which may lie within the intent of my claims.

Having thus described my invention, I claim as new and desire to secure by Letters Patent—

1. A metallic end cuff for insulating sleeves comprising concentric annular flanges at one end for receiving the end of the sleeve therebetween, an annular cylinder portion at the other end for protecting the covering of the conductor about which it is to be positioned, and an apertured tubular portion integral with the flange and cylinder portions and positioned between said portions and radial of the latter for directing filling material therethrough, there being spaced perforations through the wall of the outer flange arranged in a circular series about the latter and leading to the space between the flanges.

2. A metallic end cuff for insulating safety sleeves comprising radially spaced, concentric annular flanges at one end for encompassing the end of the sleeve, an annular cylinder portion at the other end of the cuff for protecting the covering of the conductor about which it is to be positioned, and a radially apertured tubular portion integral with the flange and cylinder portions and positioned therebetween for directing filling material into the interior of the sleeve, there being a plurality of apertures arranged in a circular series in the outer flanges for directing cementitious material into the space between the respective flanges.

3. The combination with an insulating sleeve, of metallic cuffs having radially spaced concentric flanges encompassing the ends of said sleeve outside and inside thereof, fibrous insulating material being wrapped about the inner flange of the cuffs and about the external surface of the sleeve ends thereby filling the space between the sleeve ends and the respective flanges, there being apertures spaced apart through the outer flanges to receive suitable cement therethrough, said packed structure affording compensation for a slight radial movement of the sleeve between the flanges of said cuffs because of difference in the coefficient of expansion of the sleeve and cuffs.

4. The combination with an insulating sleeve having spaced interior annular recesses slightly remote from its respective ends, of a pair of metallic cuffs having double concentric flanges receiving the respective sleeve ends therebetween and an annular portion at the opposite ends of the cuffs, the said recesses being positioned in the space between the said flanges, there being a tubular portion integral with and between the flanged and annular portions of each cuff, for permitting feeding filling material through said tubular portions into the space in the interior of the sleeve, and a number of apertures through the outermost flanges and arranged in a circular series about the flanges to permit feeding filling cementitious material into the spaces between the outer and inner flanges of each cuff and into the said recesses in the sleeve.

In testimony whereof I hereunto affix my signature.

PATRICK CAROLAN.